(12) United States Patent
Yoshida et al.

(10) Patent No.: US 9,079,267 B2
(45) Date of Patent: Jul. 14, 2015

(54) DEVICE AND METHOD FOR APPLYING ELECTRIC DISCHARGE ON OPTICAL FIBER

(71) Applicant: FUJIKURA LTD., Koto-ku, Tokyo (JP)

(72) Inventors: Kazuyuki Yoshida, Sakura (JP); Katsumi Sasaki, Sakura (JP); Noriyuki Kawanishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 13/741,714

(22) Filed: Jan. 15, 2013

(65) Prior Publication Data

US 2013/0126502 A1    May 23, 2013

Related U.S. Application Data (63) Continuation of application No. PCT/JP2011/051112, filed on Jan. 21, 2011.

(51) Int. Cl.
*B23K 33/00* (2006.01)
*B23K 28/00* (2006.01)
*G02B 6/255* (2006.01)

(52) U.S. Cl.
CPC .............. *B23K 28/00* (2013.01); *G02B 6/2551* (2013.01); *G02B 6/2553* (2013.01)

(58) Field of Classification Search
CPC ..... B23K 9/013; G02B 6/2553; G02B 6/2551
USPC .............. 65/407; 219/137 R, 24.21, 68, 69.1, 219/124.1, 124.33, 124.4, 383, 384; 385/11, 12, 13, 14, 15, 16, 24, 27, 28, 385/31, 33, 39, 42, 49, 51, 52, 53, 55, 70, 385/71, 76, 77, 78, 83, 88, 92, 95, 96, 97, 385/98, 100, 114, 122, 147
See application file for complete search history.

(56) References Cited

U.S. PATENT DOCUMENTS

| | | | |
|---|---|---|---|
| 4,049,414 A * | 9/1977 | Smith | 65/407 |
| 6,799,903 B2 * | 10/2004 | Saito et al. | 385/96 |
| 6,817,786 B2 * | 11/2004 | Sato et al. | 385/96 |
| 6,833,532 B1 * | 12/2004 | Flanders et al. | 219/383 |

(Continued)

FOREIGN PATENT DOCUMENTS

| | | | |
|---|---|---|---|
| JP | 1159605 A | 6/1989 | |
| JP | 06-174961 A | 6/1994 | |

(Continued)

OTHER PUBLICATIONS

English language translation of JP2004-062089 (cited in IDS).*

(Continued)

*Primary Examiner* — Dana Ross
*Assistant Examiner* — Joseph Iskra
(74) *Attorney, Agent, or Firm* — Sughrue Mion, PLLC (57) ABSTRACT

A device for applying electric discharge on an optical fiber by electrodes is comprised of a first driving mechanism for controllably driving the electrodes in a first direction perpendicular to an axial direction of the optical fiber; and a second driving mechanism for controllably and synchronously driving the electrodes in a second direction perpendicular to the axial direction of the optical fiber but not identical to the first direction.

9 Claims, 7 Drawing Sheets

(56) References Cited

U.S. PATENT DOCUMENTS

| | | |
|---|---|---|
| 6,854,293 B2 | 2/2005 | Kasuu et al. |
| 2002/0176673 A1 | 11/2002 | Kasuu et al. |
| 2003/0056547 A1* | 3/2003 | Yamada et al. ............ 65/407 |
| 2007/0018158 A1* | 1/2007 | Nagashima et al. ......... 257/48 |

FOREIGN PATENT DOCUMENTS

| | | |
|---|---|---|
| JP | 2002-250836 A | 9/2002 |
| JP | 2003-084166 A | 3/2003 |
| JP | 2003/098376 A | 4/2003 |
| JP | 2003-248133 A | 9/2003 |
| JP | 2004-062089 A | 2/2004 |

OTHER PUBLICATIONS

English language translation of JP06-174961 (cited in IDS).*
Chinese Office Action corresponding Application No. 201180031725.1 issued May 22, 2014.
European Search Report for corresponding Application No. 11856305.5, issued Apr. 10, 2014.
Communication dated Feb. 23, 2015 from the European Patent Office in counterpart European Application No. 11856305.5.

* cited by examiner

DEVICE AND METHOD FOR APPLYING ELECTRIC DISCHARGE ON OPTICAL FIBER

CROSS-REFERENCE TO RELATED APPLICATIONS

This application is a Continuation Application of PCT International Application No. PCT/JP2011/051112 (filed Jan. 21, 2011), published as International Publication No. WO2012098681, designating the United States, the entire contents of which are incorporated herein by reference.

BACKGROUND OF THE INVENTION

1. Field of the Invention

The present invention relates to a device and a method for applying electric discharge on an optical fiber.

2. Description of the Related Art

To splice end faces of two optical fibers, it is usual to use arc discharge, and, by high thermal energy thereof, the end faces of the optical fibers are fused and then spliced. A device used therein is generally referred to as an optical fusion splicer or, more simply, a splicer. In this art field, it has been tried to expand heating area and equalize heating in order to realize uniform fusion. Related arts are disclosed in Japanese Patent Application Laid-open No. 2003-248133, U.S. Pat. No. 7,670,065, and Japanese Patent Application Laid-open No. 2003-84166.

SUMMARY OF THE INVENTION

In considerable circumstances, it is often desired not only to heat a large area uniformly but also to dynamically control location where to be heated. The present invention had been achieved in view of the circumstances and is intended to provide a device and a method for applying electric discharge on an optical fiber while locations of electrodes relative to the optical fiber are dynamically controlled.

According to an aspect of the present invention, a device for applying electric discharge on an optical fiber by electrodes is comprised of a first driving mechanism for controllably driving the electrodes in a first direction perpendicular to an axial direction of the optical fiber; and a second driving mechanism for controllably and synchronously driving the electrodes in a second direction perpendicular to the axial direction of the optical fiber but not identical to the first direction.

According to another aspect of the present invention, a method for applying electric discharge on an optical fiber by electrodes is comprised of driving the electrodes in a first direction perpendicular to an axial direction of the optical fiber; synchronously driving the electrodes in a second direction perpendicular to the axial direction of the optical fiber but not identical to the first direction; and supplying electricity to the electrodes to generate electric discharge.

The present invention enables application of electric discharge with dynamically controlling locations of electrodes relative to the optical fiber are dynamically controlled.

BRIEF DESCRIPTION OF THE DRAWINGS

FIGS. 4A and 4B are schematic drawings illustrating an example where a location and a direction of a path of electric discharge generated by supplying electricity to the electrodes are dynamically controlled, where

FIGS. 5A-5C are operation drawings showing a pattern of moving the electrodes relative to the optical fiber, where

FIGS. 8A-8C illustrate an example of splicing end faces of both the optical fibers by means of electrodes immovable in either a horizontal direction or a vertical direction, where

DETAILED DESCRIPTION OF THE EXEMPLARY EMBODIMENTS

Exemplary embodiments of the present invention will be described hereinafter with reference to the appended drawings.

[Description of Structure of Optical Fiber Fusion Splicer]

An optical fiber fusion splicer according to an embodiment of the present invention will be described hereinafter with reference to FIGS. 1 through 3. This device is in general applicable to splicing of optical fibers but is further applicable to repair or cleaning of end faces, or removing a covering thereof. Further the device is applicable to heat treatment of optical fibers.

The optical fiber fusion splicer of the present embodiment is a device for applying electric discharge, which is generated by supplying electricity to a pair of electrodes (cathode 2 and anode 3), on end faces 1a of optical fibers 1 butting against each other and thereby fusing and splicing the end faces 1a. While, throughout the following description, the left electrode in FIGS. 1 through 3 is exemplarily referred to as a cathode 2 and the right electrode is exemplarily referred to as an anode 3, these references, of course, do not limit the invention. Further this embodiment can be applied not only to direct current discharge but also to alternating discharge, rectangular wave discharge, or pulse discharge.

Figure 1:
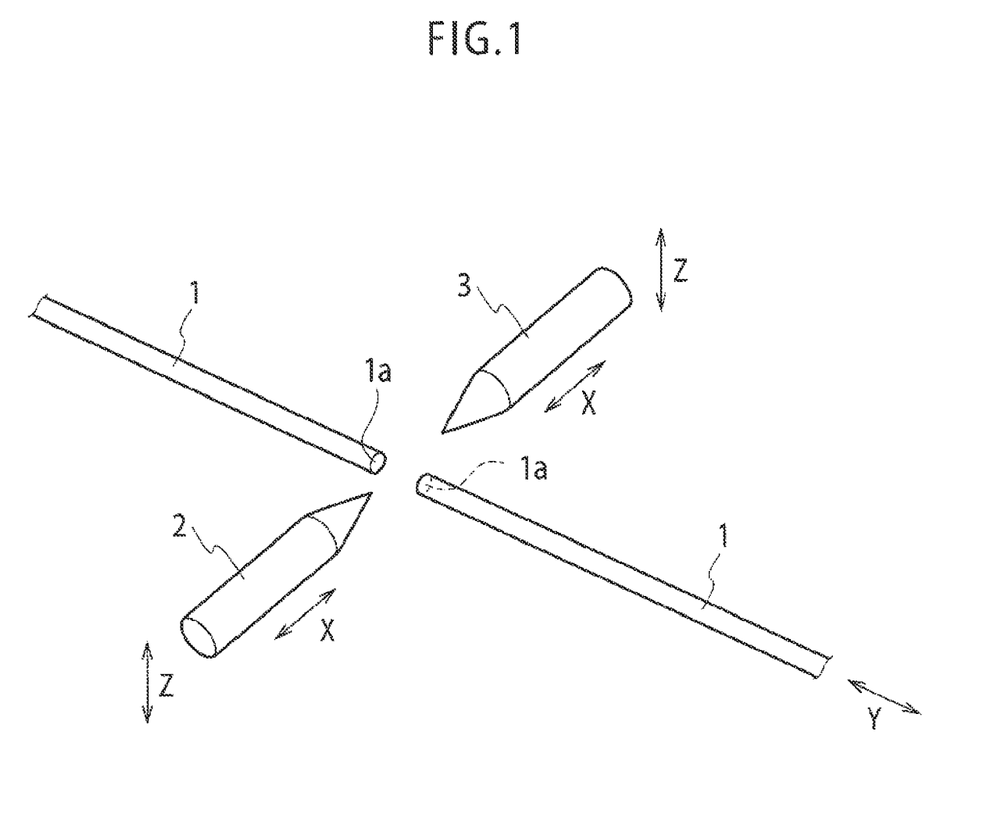
FIG. 1 is a schematic drawing depicting how to move a pair of electrodes relative to an optical fiber.

In the optical fiber fusion splicer of the present embodiment, the cathode 2 and the anode 3 are, as shown in FIG. 1, made independently movable in a vertical direction Z perpendicular to the axial direction (longitudinal direction) Y of the optical fiber 1, and further the device is comprised of a driving device for driving the electrodes 2, 3 in the axial direction (longitudinal direction) X of the electrodes 2, 3, thereby bringing them closer to or away from the optical fiber 1. Meanwhile in the following description, the axial direction X of the cathode 2 and the anode 3 is restated as a horizontal direction for convenience.

Figure 2:
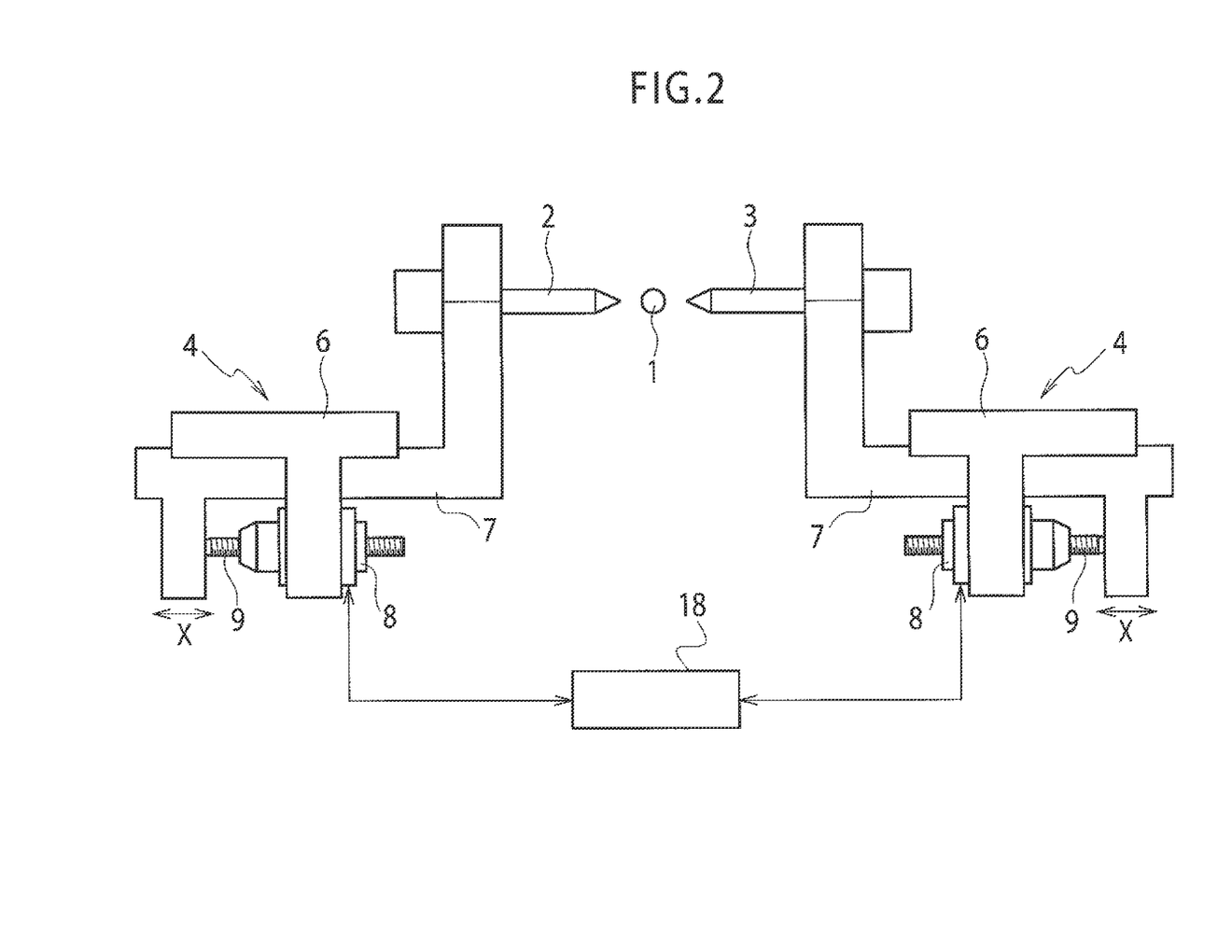
FIG. 2 is a schematic drawing depicting a first driving mechanism in an optical fiber fusion splicer, which moves the electrodes closer to or away from the optical fiber in an axial direction of the electrodes.
Figure 3:
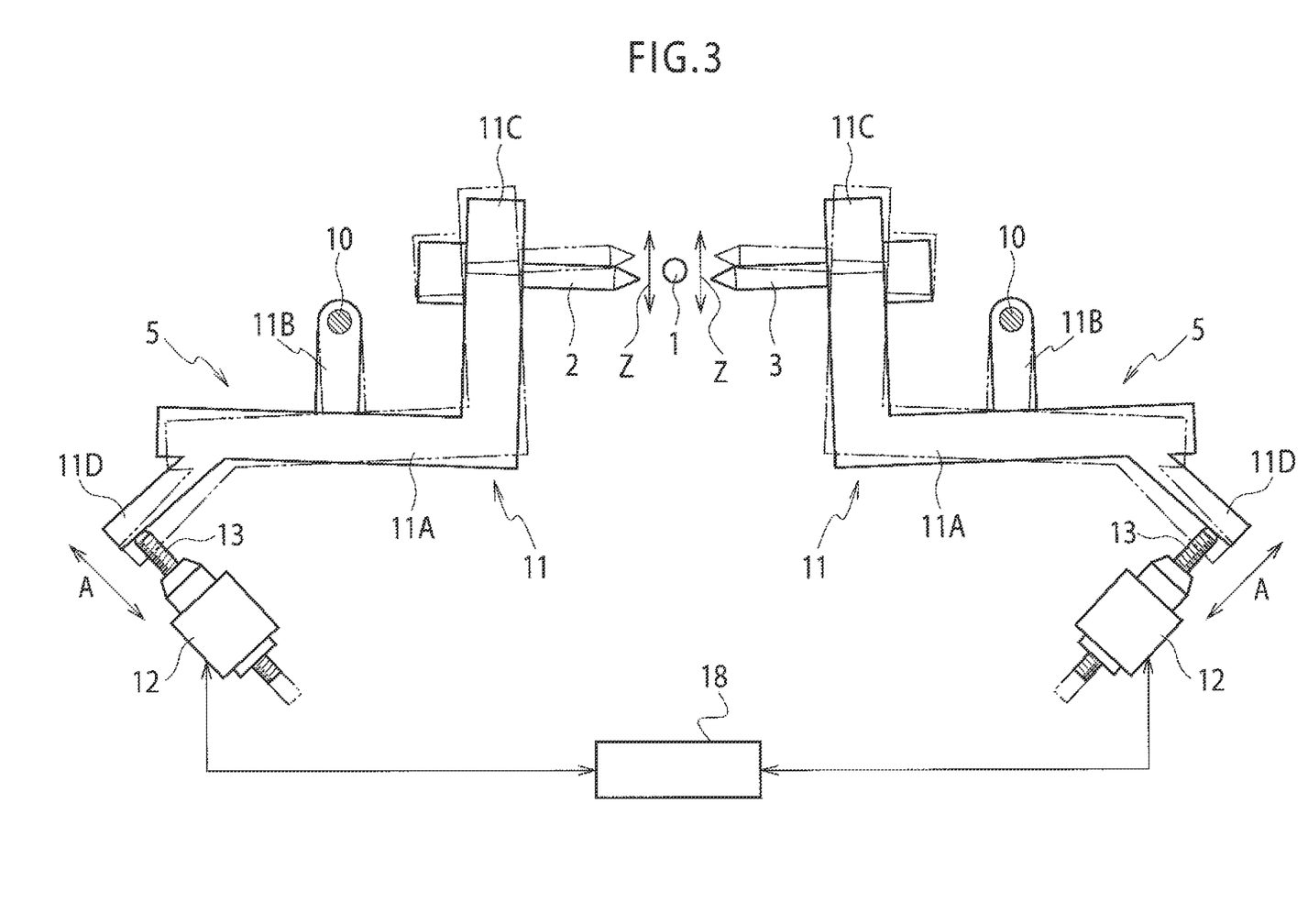
FIG. 3 is a schematic drawing depicting a second driving mechanism in the optical fiber fusion splicer, which moves the electrodes in a direction perpendicular to an axial direction of the optical fiber.

The driving device is comprised of a first driving mechanism 4 shown in FIG. 2 for making the cathode 2 and the anode 3 movable in the axial direction of the cathode 2 and the anode 3 so as to bring the cathode 2 and the anode 3 closer to or away from the optical fiber 1, and a second driving mechanism 5 shown in FIG. 3 for making the cathode 2 and the anode 3 movable in a direction perpendicular Z to the axial direction Y of the optical fiber 1.

The first driving mechanism 4 is, as shown in FIG. 2, comprised of a fixation base 6, a slider 7 slidable relative to the fixation base 6, and a slider driver portion 8 for slidingly driving the slider 7.

To the fixation base 6 attached is the slider 7 slidable in a direction shown by an arrow X in FIG. 2 (the same direction as the axial direction X of the electrodes 2, 3). Further to the fixation base 6 attached is the slider driver portion 8 for slidingly driving the slider 7.

The slider driver portion 8, as a ball screw 9 rotatingly driven by a servomotor is attached to the slider 7, makes the slider 7 slidable relative to the fixation base 6.

The second driving mechanism 5 is, as shown in FIG. 3, comprised of an arm 11 rotatably attached about a pivot 10 relative to the slider 7, and an arm driving portion 12 for driving the arm 11.

The arm 11 has an arm main body portion 11A substantially forming an L-letter shape, a link portion 11B for linking the arm main body portion 11A with the pivot 10, a fixation portion 11C for fixing the cathode 2 or the anode 3, and an application portion 11D for receiving the driving force from the arm driving portion 12, for example.

Preferably the fixation portion 11C is provided on one end of the arm main body portion 11A, and the application portion 11D is provided on the other end. The link portion 11B is provided at substantially the mid position between the fixation portion 11C and the application portion 11D.

To the fixation portion 11C secured is the cathode 2 or the anode 3. Any of these electrodes preferably forms a round bar shape and has a tip of a conical shape. Or, a rectangular bar shape, a strip shape, or a mass shape is applicable instead of the round bar shape. Further the tip may be pyramidal or in any tapered shape. The application portion 11D may be provided in a shape of projecting from the arm main body portion 11A and extending obliquely rearward.

The arm driving portion 12 is so configured as to give a substantially linear motion to the application portion 11D. Such configuration may use a ball screw 13 comprising a servomotor for example. Alternatively a hydraulic device or a proper linkage may be used.

When the application portion 11D moves in the direction A, the arm 11 swings about the pivot 10, thereby the cathode 2 or the anode 3 makes a substantially linear motion along the direction Z. The distance from the application portion 11D to the pivot 10 and the distance from the tip to the pivot 10 may be made substantially mutually equal or differentiated in order to amplify or contract the motion. Alternatively, instead of the simple arm, a proper crank mechanism or a linkage may be applied thereto. More accurate linear motions may be realized by using a proper linkage.

When the arm driving portion 12 gives a motion to the application portion 11D in the direction of the arrow A shown in FIG. 3 so as to advance or back it, the cathode 2 or the anode 3 is driven along the direction Z via the arm 11. The direction Z is perpendicular to the axial direction (longitudinal direction) Y of the optical fiber 1. In FIG. 3, the cathode 2 and the anode 3 are movable in a range between the position of the solid lines in the drawing and the position of the two-dot chain lines.

And, according to the optical fiber fusion splicer of the present embodiment, the second driving mechanism 5 for moving the cathode 2 and the second driving mechanism 5 for moving the anode 3 are so constituted as to move independently. They may be for instance so constituted that the cathode 2 and the anode 3 synchronously move to steadily oppose to each other and draw the same trajectory. Further, they may be so constituted that one of the electrodes 2, 3 is made to go up when another goes down so that positions of the electrodes 2, 3 keep a deviated state.

Further, the optical fiber fusion splicer of the present embodiment has a controller 18 (see FIGS. 2 and 3) for controlling the first driving mechanism 4 and the second driving mechanism 5. This controller 18 is capable of either controlling two first driving mechanisms 4 and two second driving mechanisms 5 independently or controlling them synchronously. Further the controller 18 is capable of driving the first driving mechanism 4 and the second driving mechanism 5 synchronously.

Figure 4A:
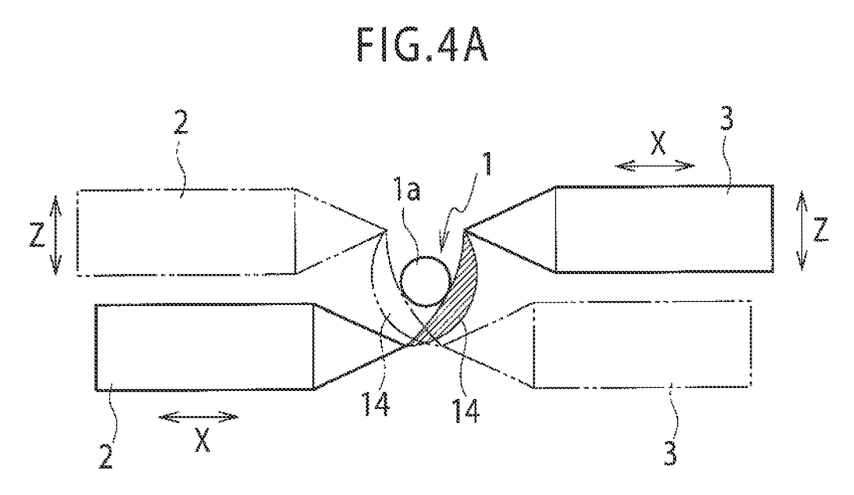
FIG. 4A depicts a process of moving the pair of electrodes in a direction perpendicular to the axial direction of the optical fiber.
Figure 4B:
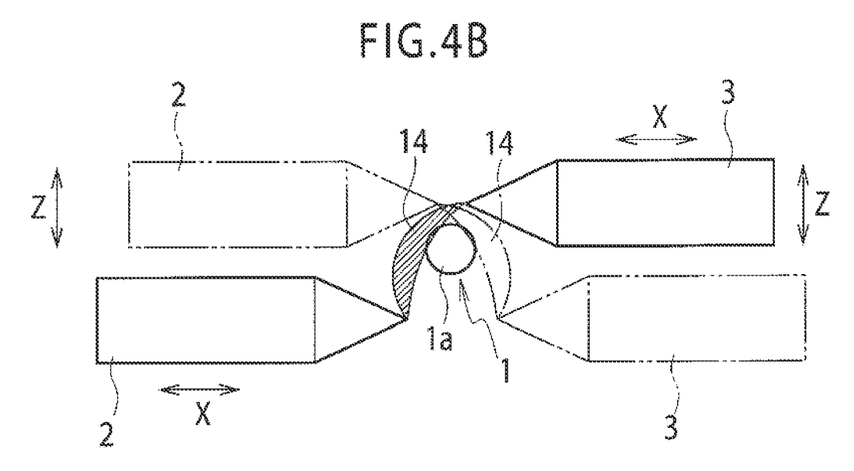
FIG. 4B depicts a process of moving the pair of electrodes in these axial direction as well as the vertical direction Z.

When an external power source supplies electricity to the cathode 2 and the anode 3, electric discharge is generated therebetween. In FIGS. 4A and 4B, a reference numeral 14 is attached to a discharge path through which the electric discharge passes.

The optical fiber fusion splicer as constituted in a way described above can dynamically control the position and the direction of the discharge path 14 relative to the optical fiber 1 as shown in FIGS. 4A and 4B by moving the cathode 2 and the anode 3 in the vertical direction Z and the horizontal direction X relative to the optical fiber 1.

As shown by the solid lines in FIG. 4A for example, one of the second driving mechanisms 5 is operated to move the cathode 2 below a fiber fixation position where the optical fiber 1 is disposed, and the other of the second driving mechanisms 5 is operated to move the anode 3 above the fiber fixation position. As such an electrode arrangement is made, the discharge path 14 comes in contact with the end face 1a of the optical fiber 1 in a shape in that it goes along a right side peripheral surface of the optical fiber 1 as shown by the solid lines in FIG. 4A. In this state, heat injection concentrates on the right side peripheral surface.

On the other hand, as shown by the two-dot chain lines in FIG. 4A, one of the second driving mechanisms 5 is operated to move the cathode 2 above the fiber fixation position and the other of the second driving mechanisms 5 is operated to move the anode 3 below the fiber fixation position. As such an electrode arrangement is made, the discharge path 14 comes in contact with the end face 1a of the optical fiber 1 in a shape in that it goes along a left side peripheral surface of the optical fiber 1 as shown by the two-dot chain lines in FIG. 4A. In this state, heat injection concentrates on the left side peripheral surface.

When the second driving mechanisms 5 are operated with retaining the electric discharge, the state of the solid lines in FIG. 4A continuously transits into the state of the two-dot chain lines. Then part of heat injection can be made to continuously transit from the right side peripheral surface to the lower side peripheral surface, and further to the left side peripheral surface.

The second driving mechanisms may be further operated to realize the solid lines in FIG. 4B. Then, when the second driving mechanism 5 are operated with retaining the electric discharge, the state of the solid lines in FIG. 4B continuously transits into the state of the two-dot chain lines. Then part of heat injection can be made to continuously transit from the left side peripheral surface to the upper side peripheral surface, and further to the right side peripheral surface.

In the process described above, the first driving mechanisms may be operated in synchronism with the second driving mechanisms to move either or both of the cathode 2 and the anode 3 in the direction X so that the distance between the electrodes is kept constant. The constant distance between the electrodes promotes stability of the electric discharge and is therefore advantageous in stabilizing the amount of heat injection. Or, the distance between the electrodes may be dynamically controlled. This results in providing changes in heat injection depending on part of heat injection.

More specifically, the present embodiment enables heat injection along a direction of the periphery of the optical fiber. It improves quality of axial symmetry of fusion of the optical fiber. It enables suppression of transmission loss at the spliced part. Further, because the amount of heat injection can be varied depending on part of heat injection, it enables concentrated heating of particular part. It provides advantages in a case where optical fibers with anisotropy are to be spliced or in a case where special heat treatments are to be executed. Merely to expand heating area or equalize heating does not create these effects.

In the process described above, the optical fiber 1 can be left in a fixed position. Thus the optical fiber 1 can be precisely put in place.

Further the optical fiber fusion splicer of the present embodiment is so constituted as to enable moving two second driving mechanism 5 and two first driving mechanism 4 independently. The cathode 2 and the anode 3 can be moved in ways as shown in the respective drawings of FIGS. 5A-5C.

Figure 5A:
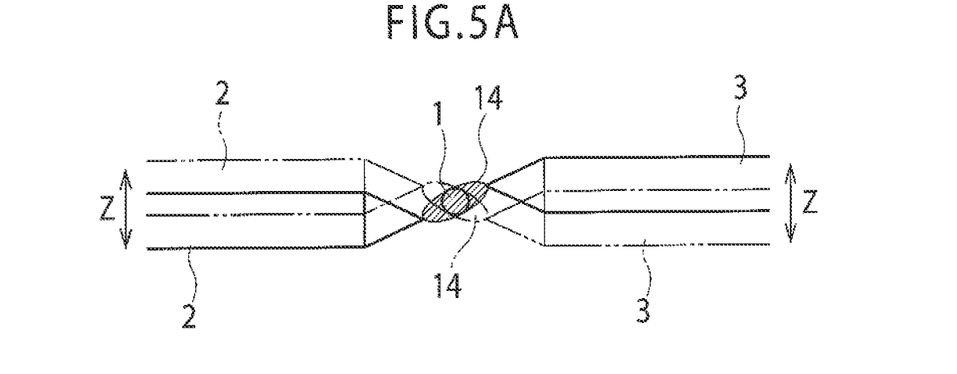
FIG. 5A illustrates an example of vertically moving the cathode and the anode with deviating these relative positions.
Figure 5B:
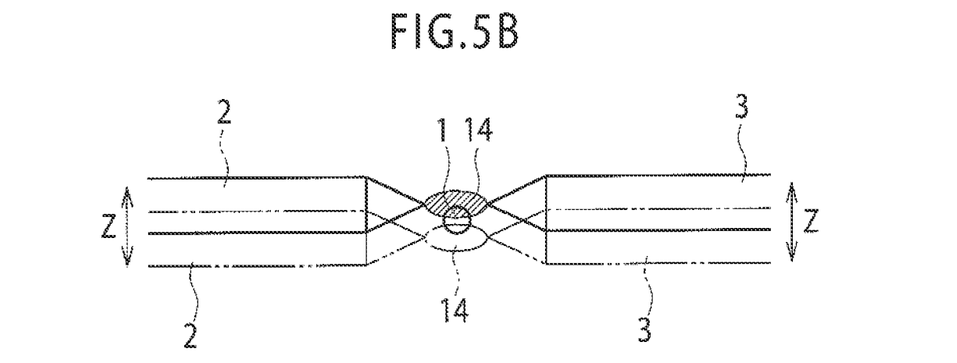
FIG. 5B illustrates an example of vertically moving the cathode and the anode steadily on an identical axis synchronously.
Figure 5C:
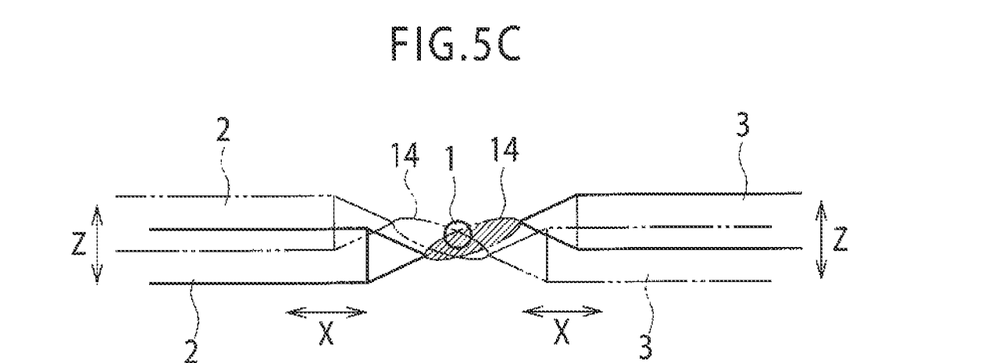
FIG. 5C illustrates an example of horizontally moving the cathode and the anode so as to bring them closer to and away from the optical fiber as well as vertically moving them with deviating these relative positions.
Figure 6:
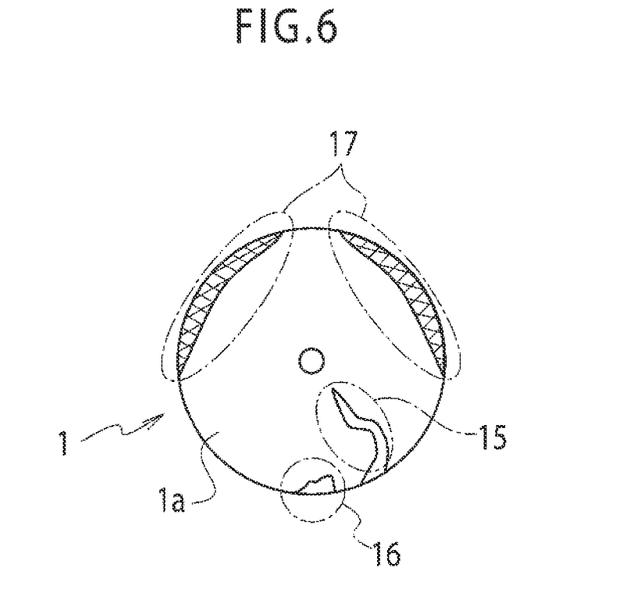
FIG. 6 is an enlarged elevational view of an end face of an optical fiber with a score, a chip, or hackles.

In FIG. 5A, the cathode 2 and the anode 3 are moved to make reciprocating motion in the vertical direction Z with making relative positions (height) of the cathode 2 and the anode 3 to deviate. In FIG. 5B, the cathode 2 and the anode 3 are synchronously moved to make reciprocating motion in the vertical direction Z with placing the cathode 2 and the anode 3 commonly on an axis and keeping this oppositely disposed state steadily. In FIG. 5C, as well as the cathode 2 and the anode 3 are moved to make reciprocating motion in the vertical direction Z with making relative positions (height) of the cathode 2 and the anode 3 to deviate, the cathode 2 and the anode 3 are horizontally moved to make reciprocating motion so as to come closer to and away from the optical fiber 1.

Proper selection from these patterns of electrode motion in shown FIGS. 5A-5C is carried out depending on the diameter of the optical fibers to be spliced. When the diameter of the optical fibers is relatively small, the pattern of electrode motion shown in FIG. 5B is sufficient to heat the totality of the end faces of the optical fibers 1. In regard to the optical fibers 1 with a relatively large diameter, when the pattern of electrode motion as shown in FIG. 5B is determined to be insufficient, any pattern of electrode motion shown in FIG. 5A or FIG. 5C may be applied.

[Description of Method for Splicing Optical Fibers]

Next a method for splicing optical fibers using the optical fiber fusion splicer as described above will be described. First, prior to fusion splicing of the end faces 1a of the optical fibers 1, in a case where the end faces 1a of the optical fiber 1 include a score 15, a chip 16, or a hackle 17, repair thereof is executed by applying electric discharge on these spots.

Figure 7:
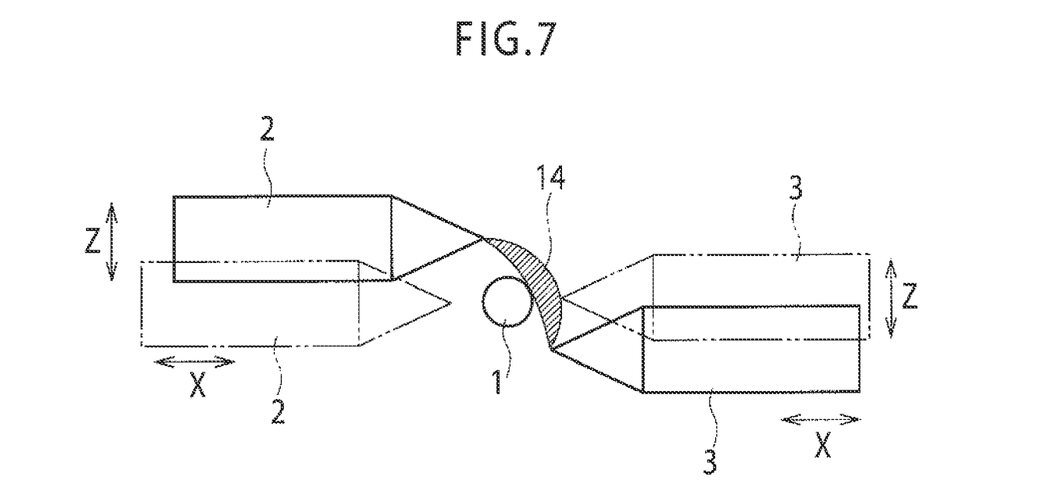
FIG. 7 is an operation drawing illustrating an example of generating electric discharge with moving the electrodes to repair an end face of an optical fiber with a score, a chip, or hackles.

Work of repair includes, as shown in FIG. 7, operating two second driving mechanisms 5 and two first driving mechanisms 4 by the controller 18 independently to move the cathode 2 and the anode 3 in the vertical direction Z and the horizontal direction X with deviating these relative positions (height and horizontal distance), so that the discharge path 14 moves toward the spots, where the score 15, the chip 16, or the hackle 17 exist(s), and generating electric discharge. Depending on the size or the position of the score 15 or such, merely one of the second driving mechanism 5 and the first driving mechanism 4 is operated on demand.

When electric discharge is applied on the end face 1a of the optical fiber 1, the subject spot is fused and then the score 15, the chip 16, or the hackles 17 is (are) repaired.

Next the end faces 1a of two optical fibers 1 are made to abut on each other. Then electric discharge generated by supplying electricity to the cathode 2 and the anode 3 is applied on the part where the end faces 1a of the optical fibers 1 abut on each other. During the electric discharge, the second driving mechanism 5 is operated to move the cathode 2 and the anode 3 in the perpendicular moving pattern shown in FIG. 5A or FIG. 5B so as to vary the position and the direction (inclination) of the discharge path 14 relative to the optical fiber 1, thereby fusing and splicing the end faces 1a of the optical fibers 1.

If the whole surface of the end faces 1a is not exposed to the discharge path 14 without unevenness in regard to the position and the direction of the discharge path 14 relative to the optical fiber 1, the first driving mechanism 4, as well as the second driving mechanism 5, is operated. Thereby, with the pattern of the horizontal motion as shown in FIG. 5C, electric discharge can be applied over the whole of the end face 1a of the optical fiber 1.

Figure 8A:
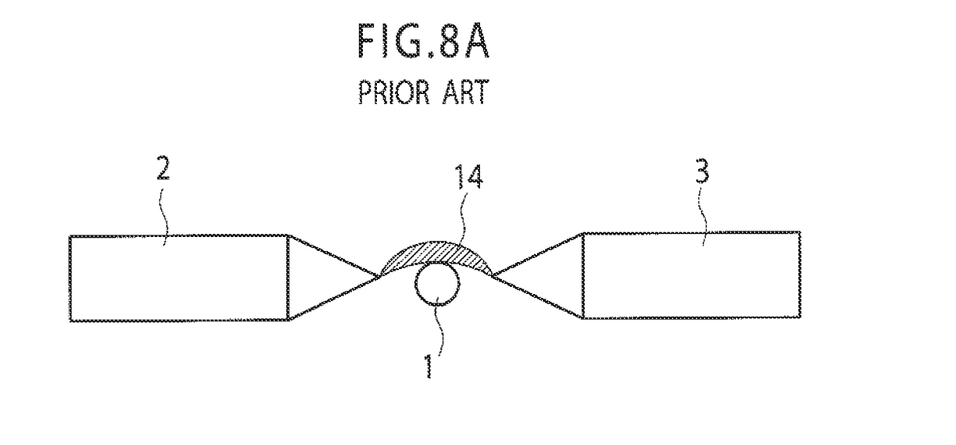
FIG. 8A is a state diagram of a path of electric discharge when the axis of the electrodes is made identical in height to an axial center of the optical fiber.
Figure 8B:
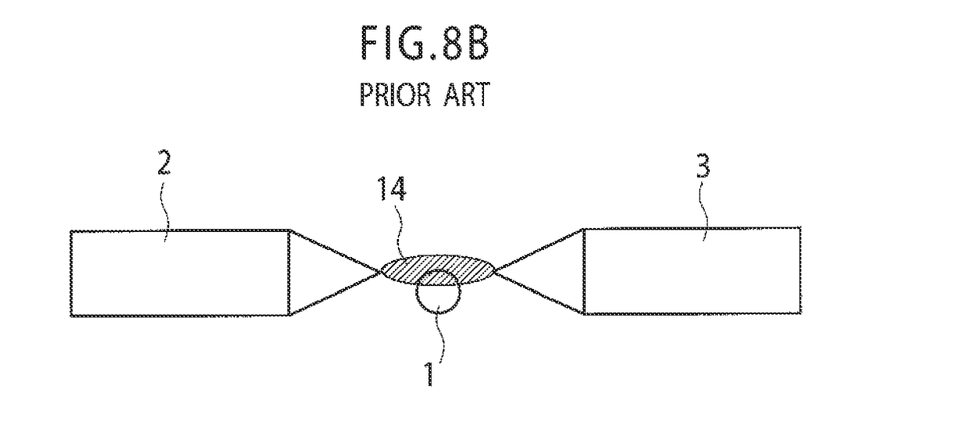
FIG. 8B is a state diagram of a path of electric discharge when the axis of the electrodes is made higher than the axial center of the optical fiber.
Figure 8C:
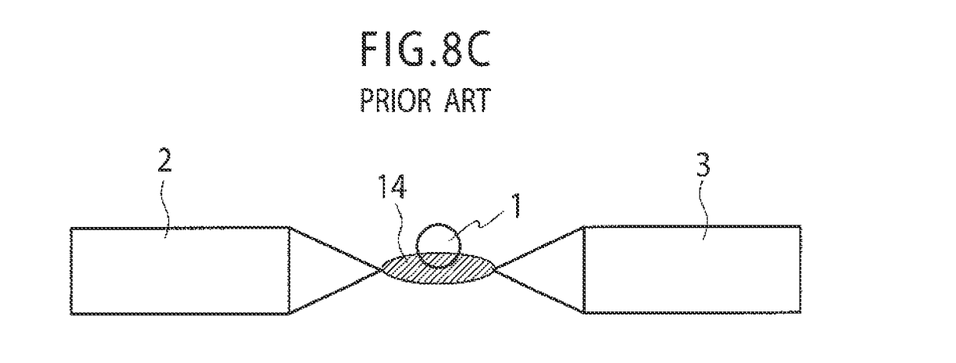
FIG. 8C is a state diagram of a path of electric discharge when the axis of the electrodes is made lower than the axial center of the optical fiber.

In contrast, as shown in FIGS. 8A-8C, in a case where the cathode 2 and the anode 3 are steadily opposed to each other on an identical axis and do not move in the vertical direction Z, the discharge path 14 is not applied on the whole of the end face 1a if the optical fiber 1 is relatively large in diameter. In a case where the axis of the electrodes 2, 3 and the center of the optical fiber 1 share the same position, the discharge path 14 passes above or below the optical fiber 1 as shown in FIG. 8A. In a case where the axis of the electrodes 2, 3 is higher than the center of the optical fiber 1, the discharge path 14 does not go on the lower side of the optical fiber 1 as shown in FIG. 8B. In a case where the axis of the electrodes 2, 3 is lower than the center of the optical fiber 1, the discharge path 14 does not go on the upper side of the optical fiber 1 as shown in FIG. 8C. Further, in any case of FIGS. 8A-8C, part of the optical fiber 1 closest to the electrodes is not exposed to the discharge path 14 and therefore receives the relatively small amount of heat. In contrast, the present invention enables exposure of the whole of the end face 1a of the optical fiber 1 to the discharge path 14 without unevenness.

[Effects of the Present Embodiment]

According to the present embodiment, the optical fiber fusion splicer is comprised of a driving device for making the cathode 2 and the anode 3 to be movable in the vertical direction Z relative to the axial direction of the optical fiber 1 independently, and making the position and the direction of the discharge path 14 generated by moving the cathode 2 and the anode 3 relative to the optical fiber 1 to be variable. Even though the optical fiber 1 is large in diameter, heating range by the discharge path 14 is expanded over the whole of the end face 1a of the optical fiber 1, thereby fusing and splicing optical fibers 1. Connection loss (transmission loss) of the spliced optical fiber 1 can be thereby reduced.

Further according to the present embodiment, as the driving mechanism makes the cathode 2 and the anode 3 to be movable so as to bring them closer to or away from the optical fiber 1, the position and the direction of the discharge path 14 is made to be more variable relative to the optical fiber 1 and thus the whole of the end face 1a of the optical fiber 1 can be exposed to the discharge path 14 in a more efficient way.

Further according to the optical fiber fusion splicer of the present embodiment, as the driving mechanism makes the cathode 2 and the anode 3 to be movable during electric discharge, it solves a problem in that part of the optical fiber 1 close to the electrodes is not exposed to the discharge path 14 in a case where the electrodes are not moving but fixed to generate electric discharge. The amount of heat injection at the part close to the electrodes can be sufficiently assured.

Further, the present embodiment does not require a complex structure to drive the electrodes.

Further, according to the present embodiment, prior to fusion splicing of the end faces 1a of the optical fibers 1, the score 15, the chip 16, or the hackle 17 on the end faces 1a of the optical fibers 1 can be repaired as electric discharge is generated with moving the electrodes 2, 3.

Although the invention has been described above by reference to certain exemplary embodiments of the invention, the invention is not limited to the exemplary embodiments described above. Modifications and variations of the embodiments described above will occur to those skilled in the art, in light of the above teachings.

INDUSTRIAL APPLICABILITY

The present invention provides a device and a method applicable to heating an optical fiber for the purpose of fusion splicing of the optical fiber or such.

What is claimed is:

1. A device for applying electric discharge on an optical fiber by a first and a second electrode, both of which are perpendicular to an axial direction of the optical fiber, comprising:
a first moving mechanism for controllably moving the first electrode in a first direction identical to an axial direction of the first and the second electrode; a second moving mechanism for controllably moving the first electrode in a second direction not identical to both the axial direction of the optical fiber and the first direction in synchronism with the first moving mechanism; a third moving mechanism for controllably moving the second electrode in the first direction; and a fourth moving mechanism for controllably moving the second electrode in the second direction in synchronism with the third moving mechanism,
wherein the second moving mechanism and the fourth moving mechanism are configured to bringing the first electrode and the second electrode away from each other in the second direction by respectively moving the first electrode and the second electrode independently of each other.

2. The device of claim 1, further comprising:
a first controller for synchronously controlling the first moving mechanism and the second moving mechanism; and
a second controller for the synchronously controlling the third moving mechanism and the fourth moving mechanism.

3. The device of claim 1, wherein each of the second moving mechanism and the fourth moving mechanism includes a pivot and an arm swingable about the pivot.

4. A method for applying electric discharge on an optical fiber by a first and a second electrode, both of which are perpendicular to an axial direction of the optical fiber, comprising:
by a first moving mechanism, moving the first electrode in a first direction identical to an axial direction of the first and the second electrode, and by a second moving mechanism, synchronously moving the first electrode in a second direction not identical to both the axial direction of the optical fiber and the first direction;
by a third moving mechanism, moving the second electrode in the first direction, and by a fourth moving mechanism, synchronously moving the second electrode in the second direction; and
supplying electricity to the first and the second electrode to generate electric discharge,
wherein the second moving mechanism and the fourth moving mechanism are configured to bringing the first electrode and the second electrode away from each other in the second direction by respectively moving the first electrode and the second electrode independently of each other.

5. The method of claim 4, further comprising:
moving the first and the second electrode so as to apply the electric discharge on a part of the optical fiber, in the part the optical fiber includes a score or a chip, to repair the optical fiber.

6. The device of claim 1, wherein all of the first through fourth moving mechanisms synchronously move.

7. The device of claim 1, wherein the second moving mechanism is attached to the first moving mechanism and the fourth moving mechanism is attached to the third moving mechanism.

8. The method of claim 4, further comprising:
synchronizing the first moving mechanism and the second moving mechanism to move the first electrode between a first state having a position relative to the optical fiber and a second state where the electrode is a farther distance to the optical fiber in the first direction.

9. The method of claim 8,
wherein, in the first state, the second electrode is a farther distance to the optical fiber in the first direction than the first electrode,
wherein, in the second state, the second electrode is a closer distance to the optical fiber in the first direction than the first electrode,
and further comprising:
further synchronizing the third moving mechanism and the fourth moving mechanism to move the second electrode between the first state and the second state.

* * * * *